UNITED STATES PATENT OFFICE.

GEORGE EDWARD WOODWARD, OF BOSTON, MASSACHUSETTS.

NON-INFLAMMABLE CELLULOID AND PROCESS FOR THE PRODUCTION THEREOF.

No. 803,952.      Specification of Letters Patent.      Patented Nov. 7, 1905.

Application filed June 21, 1904. Serial No. 213,575.

*To all whom it may concern:*

Be it known that I, GEORGE EDWARD WOODWARD, engineer, a citizen of the United States of America, and a resident of Boston, Massachusetts, have invented a certain new and useful Non-Inflammable Celluloid and Improved Process for the Production Thereof, of which the following is a specification.

The present invention relates to an improved process for the production of non-inflammable celluloid, the object being to produce a celluloid which on coming into contact with a flame does not ignite, but even under unfavorable circumstances only chars. The other good qualities of the celluloid are not influenced by treatment according to the present process, so that the non-inflammable celluloid can be used and employed like the untreated substance—for instance, for photographic as well as for kinematographic films, in place of vulcanite, as insulation of electric conductors, for the production of plastic objects and the like, or otherwise.

The process consists in mixing the celluloid with liquefied fish-glue with an addition of gum-arabic, gelatin, and rape-oil.

To one kilogram of celluloid are added one and a half liters of liquid fish-glue, four hundred grams of white gum-arabic, one hundred grams of white gelatin, and forty grams of rape-oil. The substances to be the celluloid must be of a liquid syrupy consistency.

The process is carried out in the following manner: The liquid fish-glue with the gum-arabic is put into a receptacle of glass, china, or the like and left to soak for twenty-four hours in a very dry place open to the air, therefore uncovered. Then the receptacle with its contents is placed on a water-bath and stirred—for instance, with a stirrer of china or the like—until the gum has become perfectly liquid. The temperature of the mixture must not exceed 25° centigrade. Then the gelatin is added and stirred until it is quite dissolved, so that there is no more solid residue. The mixture is then lifted off the water-bath and rape-oil is added to it while stirring continuously, when after being thoroughly mixed it is left standing about twenty-four hours to cool. Before it is quite cold it is put through a sieve in order to remove any solid pieces. After the soaking, dissolving, and cleansing by means of the sieve it is left standing in the same place open to the air. Any scum formed during the cooling is always removed. For the treatment of the celluloid a perfectly clear colorless syrup should be used The celluloid to be treated must be in a glass or china receptacle or the like in a syrupy state. The mass containing fish-glue is poured in by drops while carefully stirring, preferably in the middle of the celluloid and gradually increasing the stirring-surface. After a thorough mixing the celluloid is ready for use and on coming into contact with flame does not ignite.

The solution of fish-glue used during the process can be obtained by letting two hundred grams of fish-glue soak in a pint of cold distilled water. It is then passed through a sieve and any parts kept back are crushed so that they are completely mixed with the water. Ten grams of kitchen-salt are added to clear the mixture, and then it is again filtered.

It is to be understood that the proportions are specified above only by way of example and that the details of the process may be varied without departing from this invention.

Having now particularly described and ascertained the nature of my invention and in what manner the same is to be performed, I declare that what I claim is—

1. A process for rendering celluloid non-inflammable which comprises mixing with celluloid a solution of fish-glue, gum-arabic, gelatin and rape-oil.

2. A non-inflammable celluloid which comprises a mixture of celluloid, fish-glue, gum-arabic, gelatin, and rape-oil.

In witness whereof I have hereunto set my hand in presence of two witnesses.

GEORGE EDWARD WOODWARD.

Witnesses:
  H. D. JAMESON,
  A. NUTTING.